W. R. MUNN.
CUSHIONING DEVICE.
APPLICATION FILED MAY 9, 1910.

993,394.

Patented May 30, 1911.

Witnesses:
W. D. Kline
Ira M. Jackson

Inventor:
Walter R. Munn

UNITED STATES PATENT OFFICE.

WALTER R. MUNN, OF BATTLE CREEK, MICHIGAN.

CUSHIONING DEVICE.

993,394. Specification of Letters Patent. Patented May 30, 1911.

Application filed May 9, 1910. Serial No. 560,374.

*To all whom it may concern:*

Be it known that I, WALTER R. MUNN, a citizen of the United States, residing in the city of Battle Creek, county of Calhoun, and State of Michigan, have invented an Improvement in Cushioning Devices, of which the following is a specification.

My invention relates to improvements in cushioning devices, and is adapted, among other uses, to eliminate the jar and shock from vehicle bodies; and the objects of my improvement are, first, to provide a device of this character which will respond quickly to the force applied to it, second, to afford means for the prompt reaction of the device by the use of internal springs, third, to provide a method for adjusting the resilient power of the device to the weight of the vehicle, or the shock to which the same is subjected.

With the above and other objects which will become apparent from a description of the device, the same are attained by the novel combination of parts in the mechanism illustrated in the accompanying drawing, in which—

Figure 1:
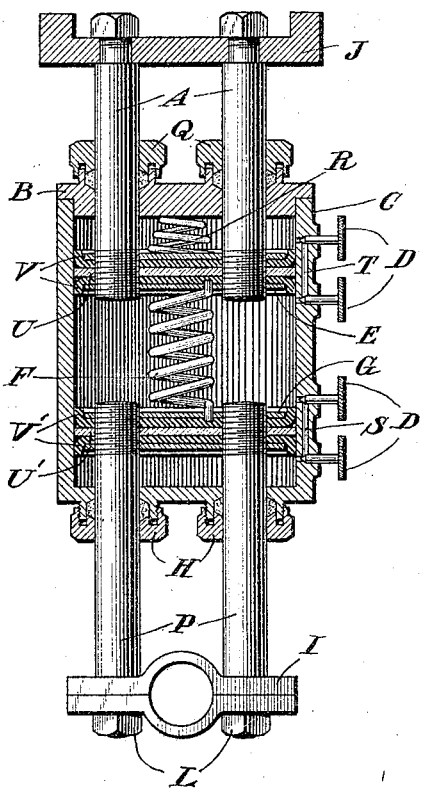
Figure 2:
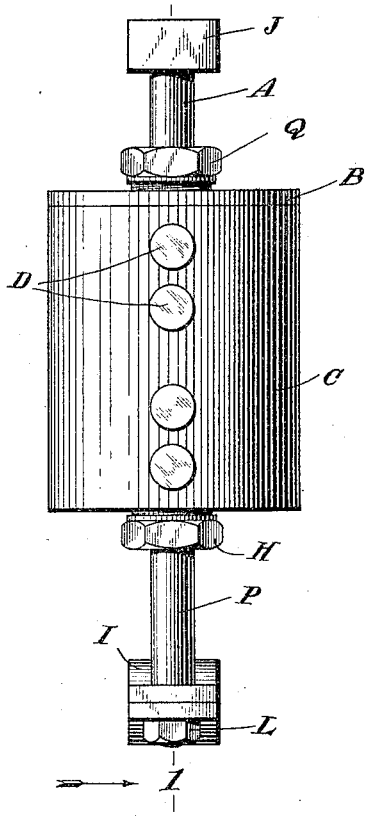
Figure 3:
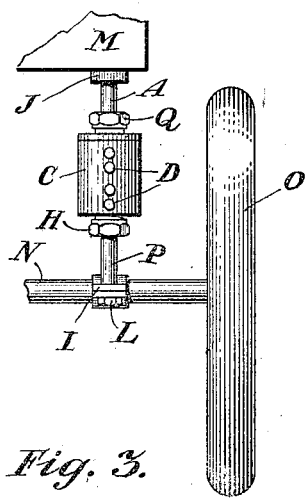

Figure 1 is a vertical, sectional view of the device, Fig. 2, an external, side view, transverse from Fig. 1, and Fig. 3 shows a vehicle with the device applied.

Similar letters refer to similar parts in all of the views.

C is a cylinder, within which operates two pistons, G and E, each of which is provided with the double rods A A and P P. The rods A A are attached to the body of the vehicle by the bracket J, as shown in Fig. 3. The rods P P are connected with the axle of the vehicle by means of the two-piece clamp connection I and nuts L, in the manner shown in Fig. 3. The openings in the cylinder for the passage of the piston rods are packed with metallic packing, which is retained by the jam-nuts H and Q. The piston heads G and E preferably consist of at least three metallic plates, the middle one U U' being separated from the outer plates by leather packings V V and V', V', the outer edges of each set being beveled in opposite directions to secure perfect adjustment with the inner circumference of the cylinder, the better to secure the air cushion between the piston heads, as hereinafter described. Between the two piston heads and attached to the same is a stiff, coiled spring F, and between the cylinder head B and the piston head E, a conical spring R is affixed.

T and S are longitudinal openings, relatively placed, within the walls of the cylinder C, and are designed for air passages, the openings of which are adjustable by screw valve regulators, D, which are provided with pointed tips for delicate adjustment.

The operation of the device, when attached to a vehicle, is as follows:—The cylinder is attached in the manner already described; when the axle and the body of the vehicle are in a relatively normal position, the pistons occupy the positions within the cylinder as illustrated in Fig. 1, the upper piston-head being about midway the air passage T and the lower piston-head being in the same position with reference to air passage S. When the wheel O meets a depression, the lower piston drops from its normal position and forces the air from the lower chamber of the cylinder into the middle chamber through the air passage S, until the piston-head closes the lower opening of said air passage, when the confined air remaining in such lower chamber resists the further downward movement of the piston-head, and deadens the shock. The movement is then reversed, being accelerated by the spring F, until the piston-head passes the upper port of air passage S, when resistance is again met by the confined cushion of air in the middle chamber, and the coiled spring. The upper piston-head is controlled in the same manner and operates in conjunction with the lower piston-head, the spring R being used to accelerate the reaction of the upper piston-head, and to prevent forcible contact between the piston and the cylinder head B.

The device is intended for use either with ordinary vehicle springs, or to supersede springs entirely, and by means of the screw valve regulators, D, the efficiency of the device can be accommodated to the weight and spring action of the vehicle, by adjusting the size of the air passages and thereby facilitating or retarding the speed of the piston.

I do not wish to limit the invention to the use of air alone, as the device is designed for the use of any elastic fluid, although air is preferred as the cushioning medium.

Claims:—

1. In cushioning devices, the combination of a cylinder provided with duplex pistons, one of which operates in each end of said cylinder, a spiral spring placed between the two pistons and attached to the same, a conical spring between the head of said cylinder and the upper piston, means for the passage of an elastic fluid from one part of said cylinder to another, and means for adjusting the size of the passages, all substantially as described.

2. A cushioning device comprising in combination a cylinder with closed heads, pistons disposed in said cylinder adapted to form air-tight chambers, piston rods connecting said pistons with the body and axle, respectively, of a vehicle, a spiral spring separating said pistons within the cylinder, a conical spring disposed between the head of said cylinder and the upper piston, means for conducting an elastic fluid from one chamber of said cylinder to another, all as described herein.

WALTER R. MUNN.

Witnesses:
W. D. KLINE,
KASSEN RICHARDSON.